United States Patent

Wright

[15] 3,673,813
[45] July 4, 1972

[54] TORSIONALLY RESILIENT SHAFT COUPLING

[72] Inventor: John Wright, Baltimore, Md.
[73] Assignee: Koppers Company, Inc.
[22] Filed: March 12, 1971
[21] Appl. No.: 123,666

[52] U.S. Cl. ..................................64/1 V, 64/11 R, 62/26
[51] Int. Cl. ..............................................F16c 3/00
[58] Field of Search..........................64/1 R, 1 V, 11, 23, 26

[56] References Cited

UNITED STATES PATENTS 3,194,083  7/1965  Ballard....................................64/1 V
3,263,450  8/1966  Condon....................................64/1 X

*Primary Examiner*—Kenneth W. Sprague
*Attorney*—Boyce C. Dent, Oscar B. Brumback and Olin E. Williams

[57] ABSTRACT

A torsionally flexible shaft coupling for transmitting torque from a driving shaft to a driven shaft includes three radially overlying concentric tube members attached to each other. The attachment with a succeeding concentric member is axially spaced from the attachment with an immediately preceding concentric member for transmitting torque from the driving shaft consecutively through each succeeding concentric member and subsequently to the driven shaft.

16 Claims, 7 Drawing Figures

INVENTOR
JOHN WRIGHT
BY
his ATTORNEY

INVENTOR
JOHN WRIGHT
BY his ATTORNEY

TORSIONALLY RESILIENT SHAFT COUPLING

BACKGROUND OF THE INVENTION

1. Field of the Invention

This invention relates generally to resilient shaft couplings and more particularly to those having yielding elements.

2. Description of the Prior Art

Generally, resilient couplings are used to transmit torque from a driving shaft to a driven shaft. In addition, resilient couplings are generally required to provide torsional flexibility and, in some cases, small amounts of offset and angular misalignment between driving and driven members although the driving and driven shafts themselves provide some torsional flexibility in drive systems.

An example of a practical application for torsionally resilient shaft couplings includes the drive train for rolls used in rolling mills for reducing the thickness of metal strips. In such rolling mill drive trains, high impact or shock loads are encountered and shaft couplings provide most of the needed torsional flexibility.

The drive train of rolling mills generally comprises electric motors coupled to reduction gears which are coupled through a shaft/coupling combination comprising two gear couplings connected by a shaft to a pinion stand. The pinion stand has two output shafts which drive the rolls to reduce the strip thickness. In some cases the reduction gears are omitted and the shaft of the shaft/coupling combination between the motors and the pinion stand is elongated because the motors and pinion stand are housed within separate rooms; therefore, the shaft must pass through a dividing wall in order to connect the motors and the pinion stand.

The drive system's dynamic characteristics are frequently such that an increase in torsional flexibility, or, stated another way, a reduction in torsional stiffness of the above mentioned connecting shaft, is desired in order to lower the system torsional natural frequency or frequencies to reduce system response to torsional excitation caused by strip entry into the rolls.

The use of a conventional torsionally resilient coupling in such drive systems is frequently impractical because the magnitude of torque would require a massive and expensive coupling. An example of a frequently used torsionally resilient coupling is illustrated in Croset U.S. Pat. No. 2,621,493.

Similarly, in main propulsion drives of large ships there is an increasing tendency to mount the propulsion prime mover farther aft than has been done previously. This reduces the length available for the drive system and therefore reduces the torsional flexibility of the tail shafting. It is often desirable to increase the torsional flexibility of the reduced length shafting in order to attenuate torsional vibration. In this case, also, due to the magnitude of the torque involved, a conventional torsionally resilient coupling would be massive and expensive.

A further application for torsionally resilient shaft couplings includes turbine powered drive systems such as those associated with centrifugal compressors where similar shaft/coupling combinations are employed to provide axial, (i.e. along the shaft axis) offset, (i.e. normal to the shaft axis) and angular (i.e. at some angle to the shaft axis) misalignment capabilities.

SUMMARY OF THE INVENTION

Accordingly, an object of the present invention is to provide a torsionally resilient shaft coupling for a drive system which is capable of providing substantially higher torsional flexibility than presently used couplings and which can accommodate some offset and angular misalignment between driving and driven members.

This object is achieved in the present invention by providing a plurality of radially overlying concentric tube members attached to each other so that the attachment or connection with a succeeding concentric member is axially spaced from the attachment with an immediately preceding concentric member for transmitting torque from the driving member consecutively through each succeeding concentric member and subsequently to the driven member. The sizes of the tube members are preferably selected to provide an annular clearance cavity between the adjoining members to permit flexing of the coupling when the driving and driven members are misaligned.

If desired, the coupling may further include piloting means for maintaining the tubular members substantially concentric. In addition, vibration damping means, such as a highly viscous liquid or a solid resilient material, may be sealed in the annular clearance cavities.

In an alternate embodiment, the intermediate tubular members may be frusto-conical to form tapered annular clearance cavities. Similarly, the tapered cavities may be filled with vibration damping means if desired.

The coupling may be rigidly attached, at opposite ends thereof, to the drive and driven members. The coupling without piloting or damping means can withstand limited offset and angular misalignment between the axes of the driving and driven shafts. However, when needed, additional axial, offset or angular misalignment capability can be provided by combining the tubular coupling with a gear type similar coupling.

The objects will be more completely disclosed and the invention described in the following specification, the accompanying drawings and the appended claims.

DRAWINGS

In the drawings wherein like parts are marked alike:

DESCRIPTION OF THE PREFERRED EMBODIMENT

Figure 1:
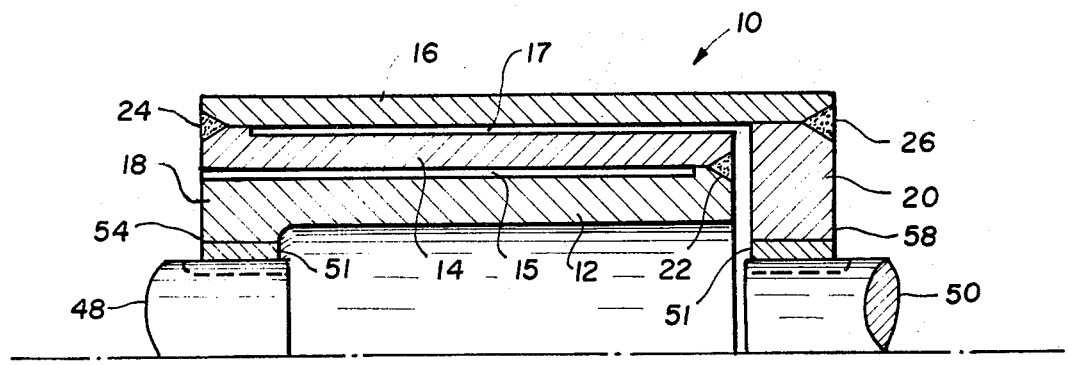
FIG. 1 is a partial side elevation in cross section showing the basic configuration of the concentric tube members of the coupling.
Figure 6:
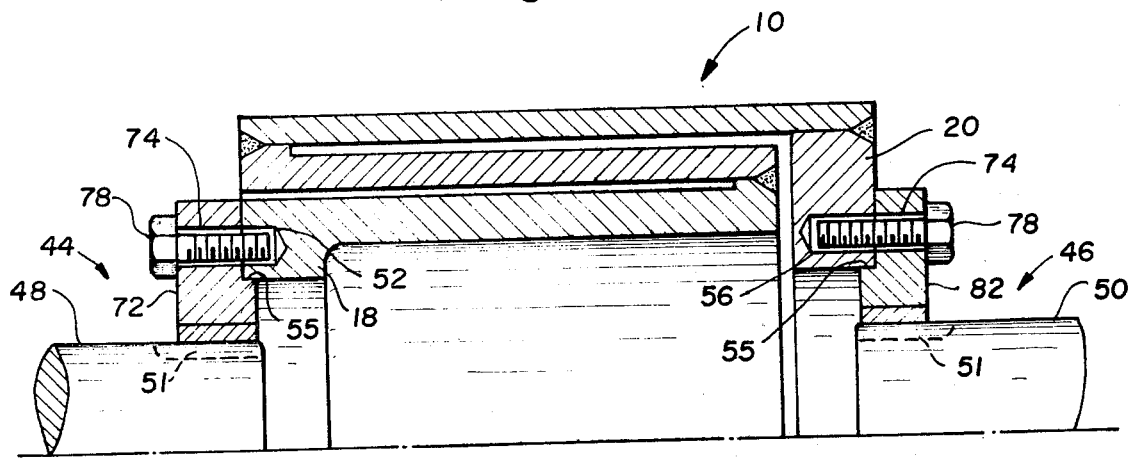
FIG. 6 shows the basic coupling of FIG. 1 further including driving and driven hub members secured for rotation with their respective shafts.
Figure 7:
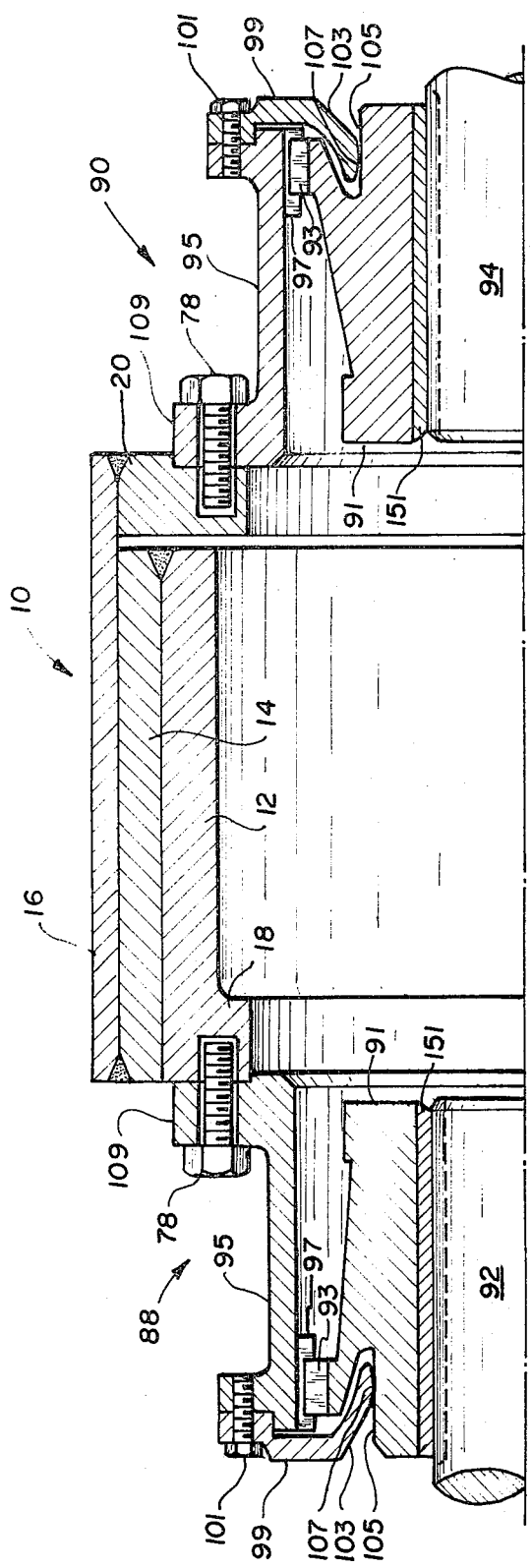
FIG. 7 shows the basic coupling of FIG. 2 combined with inner and outer hub members of a gear-type coupling to provide additional misalignment capability.

The basic torsionally flexible coupling is illustrated in FIG. 1 and generally designated 10. The coupling generally comprises substantially concentric outer tubular member 16, intermediate tubular member 14 and inner tubular member 12. Flanges 18 and 20 on the inner and outer members 12 and 16 respectively are provided for attaching the coupling 10 directly to driving and driven members 48 and 50 by means of conventional keys 51 or through hubs 72 and 82 as illustrated in FIG. 6, or, flanges 18 and 20 may be attached to gear type coupling members 88 and 90 as illustrated in FIG. 7. One end of intermediate member 14 is connected to a corresponding end of inner member 12 and the opposite end is connected to a corresponding end of outer member 16.

Thus, as shown in FIG. 1, torque caused by rotation of shaft 50 is transmitted through a first connection, e.g. flange 20, to outer member 16; torque from outer member 16 is transmitted to intermediate member 14 through a second connection, e.g. weld 24; torque is transmitted from intermediate member 14 to inner member 12 through a third connection, e.g. weld 22; and finally torque is transmitted from inner member 12 to shaft 48 through a fourth connection, e.g. flange 18; thus, torque is transmitted from shaft 50 to shaft 48 through these connections at alternate axially spaced locations. However, since the coupling 10 is bi-directional, torque can be similarly transmitted from shaft 48 to shaft 50.

The attachments or connections for tubular members 12, 14 and 16 may be any suitable means well-known in the art but preferably the tubular members are connected by welds 22, 24 and 26, as shown in FIG. 1.

Thus, it can be seen that one end of coupling 10 can twist or wind up with respect to the opposite end; it is this capability that provides torsional flexibility and enables the coupling to absorb shock loads imparted by the driving shaft thereby reducing the shock imposed on a machine element connected to the driven shaft. For example, if shaft 48 is connected to a roll in a steel rolling mill and shaft 50 is connected to a gear box through which the roll is driven by a motor (not shown), and a strip of steel enters between two of the rolls, a shock load will be imposed on shaft 48 as is well-known, especially if the lineal speed of the strip is not the same as the circumferential speed of the rolls. If shaft 48 is connected directly to the gear box, the shock load will be imposed on the gears, possibly causing breakage of the gear teeth. But, with the coupling 10 interposed in the drive train, wind up of the coupling absorbs the shock so that only a fraction of the shock is imparted to the gears.

That is, if torque is applied to shaft 48 while shaft 50 is held stationery, the coupling 10 will wind up an amount commensurate to the torque applied and relative to its proportions, and, conversely, will unwind when the torque is relieved.

Furthermore, by virtue of its construction, the coupling 10 can flex angularly a slight amount. This capability compensates for small inaccuracies in alignment of shafts 48 and 50; the misalignment may be either angular or offset.

To further compensate for greater amounts of misalignment, coupling 10 may be combined with gear-type flexible shaft couplings as illustrated in FIG. 7 as will be subsequently explained in greater detail.

The amount of twist or wind up capability can be easily calculated to provide the desired torsional flexibility and damping characteristics. Generally, the desired characteristics can be obtained by proportioning the length of the tubular members, the diameter of the members, the wall thickness of the members, and by selecting materials having particular strength and elastic values. Although any one of several materials may be used, steel is usually suitable for most applications.

Figure 2:
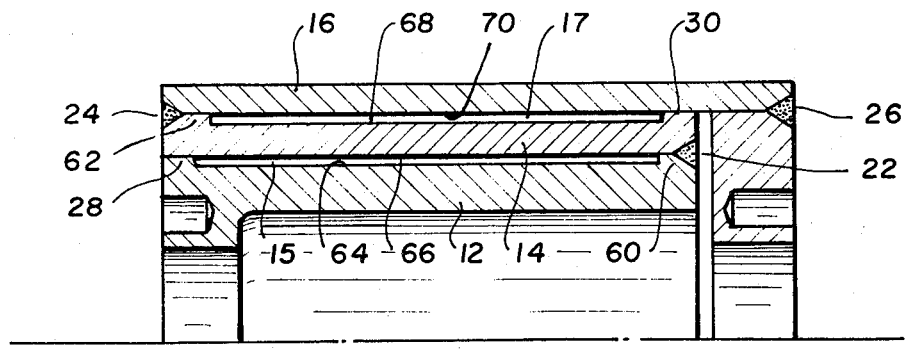
FIG. 2 shows the basic coupling of FIG. 1 including piloting means for maintaining the tubular members substantially concentric.

FIG. 2 illustrates the torsionally flexible coupling of FIG. 1 with the addition of piloting means for maintaining each of the tubes 12, 14 and 16 substantially concentric. Piloting of inner member 12 is accomplished by a raised annular seat 28 formed on one end of inner member 12 opposite the end which includes raised annular seat 60 for connecting member 12 to intermediate tube member 14 at connection 22. Likewise, intermediate member 14 is piloted by annular seat 30 formed on one end of intermediate member 14 opposite the end which includes raised annular seat 62 for connecting member 14 to outer member 16 at connection 24. Thus, the connection at 22, 24 and seats 28, 30 maintain the respective tube members in substantially equal radially spaced relationship along the length of the tubes.

Figure 3:
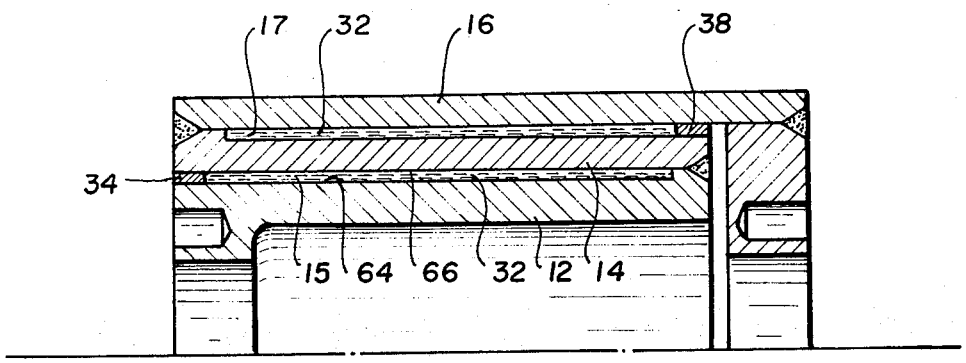
FIG. 3 shows the basic coupling of FIG. 1 including a highly viscous liquid sealed in the clearance cavity between adjacent tube members for vibration damping.

FIG. 3 illustrates the coupling of FIG. 1 further including vibration damping means in clearance cavities 15 and 17 between adjacent tube members. The vibration damping means may comprise a highly viscous liquid 32 sealed in cavities 15 and 17 between each of the adjacent tubes. For example, the liquid 32 can be sealed in cavity 15 by annular seal member 34 so that the liquid fills the cavity 15 between adjacent tubes 12 and 14. Likewise, the liquid 32 can be sealed in cavity 17 by seal 38 between adjacent tubes 14 and 16. Preferably, liquid 32 completely fills the cavities 15 and 17 between adjacent concentric tubes 12, 14 and 16 so as to effectively contact the adjacent surfaces of the tube members.

Figure 4:
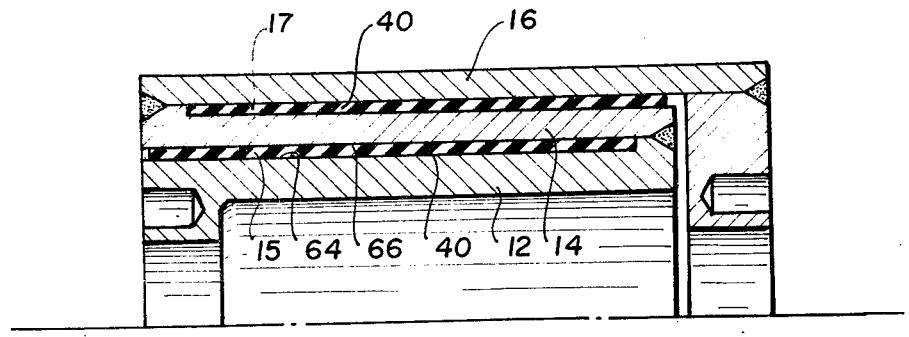
FIG. 4 shows the basic coupling of FIG. 1 including a solid resilient material in the clearance cavity adjacent tube members for vibration damping.

If desired, the vibration damping means may comprise an annular sleeve of solid resilient material in cavities 15, 17 between each of the adjacent tubes. For example, FIG. 4 shows annular sleeves of solid resilient material 40 between adjacent tubes 12, 14 and 16. The sleeves of resilient material 40 have a thickness sufficient to assure contact with each of the adjacent tubes and does not require a seal 34, 38 such as illustrated in FIG. 3 when using a highly viscous liquid as a vibration damping means.

Figure 5:
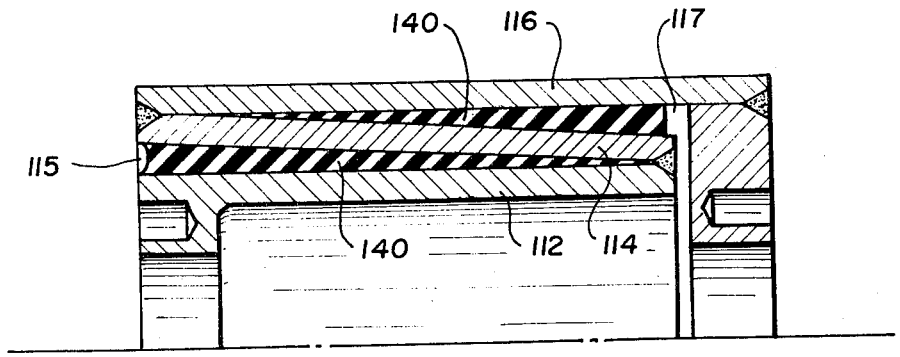
FIG. 5 shows an alternate coupling configuration including a frusto-conical tube member forming tapered clearance cavities between inner and outer tube members and including a solid resilient material within the tapered annular cavities.

Alternately, FIG. 5 illustrates tube members 112, 114 and 116 of frusto-conical configuration attached so as to form tapered annular cavities 115, 117 between the adjacent tube members. Similarly, the tapered cavities may include vibration damping means if desired.

FIG. 6 illustrates the basic coupling of FIG. 1 secured to a drive member or hub generally designated 44, and a driven member or hub generally designated 46. The configuration shown in FIG. 6 provides a limited amount of offset or angular misalignment between the axes of the drive and driven shafts 48 and 50. However, where appreciable axial, offset or angular misalignment capability is needed, a torsionally resilient tubular coupling 10 can be combined with a gear-type coupling, as shown in FIG. 7, and later discussed herein.

The basic embodiment shown in FIG. 1 illustrates three overlying concentric metal tubes 12, 14 and 16. Tube 12 is the innermost tube and therefore has a smaller diameter than tubes 14 or 16. The left end of inner member 12, as viewed in FIG. 1, includes flange 18 and may be secured for rotation directly with shaft member 48 by key 51. The opposite end of tube 12, i.e. the end opposite flange 18, is attached to one end of tube 14 by a weld 22, or by screws (not shown), or the like. Intermediate tube 14 is slightly larger in diameter than inner tube member 12. Tube 14 concentrically overlies tube 12. Similarly, tube 14 is attached to outer tube member 16 by weld 24 at the opposite end, i.e. the end opposite weld 22. Tube 16 is slightly larger in diameter than intermediate tube 14. Tube 16 concentrically overlies tube 14 and includes a flange 20 at the end opposite the attachment or connection 24 of tubes 14 and 16. Flange 20 may be made as a separate piece and connected to outer member 16 by a weld 26. Flange 20 may be secured for rotation to shaft member 50 by key 51.

The overlying concentric tube members 12, 14 and 16 are connected together as shown. If shaft 48 is the driving member, torque will first be transmitted through tube 12 and then through each of the succeeding members 14 and 16 in axially alternating directions and subsequently to driven member 50. Conversely, shaft 50 may be the driving member causing torque to first be transmitted through tube 16 and then through each of the succeeding members 14 and 12 in axially alternating directions and subsequently to driven member 48. Therefore, the coupling 10 will function equally well regardless of where torque is applied.

The three concentrically arranged tube members connected as shown transmit torque in axially alternating directions and thereby provide torsional flexibility between the drive and driven members in approximately one-third of the axial length which would be required to accomplish an equivalent amount of torsional flexibility with a single tube member. Similarly, increased torsional flexibility can be attained by using five, seven or nine members, and so on. The gain in torsional flexibility over that of a single shaft or tube of approximately the same axial length as the coupling 10 would be about three times for a three tube configuration, five times for a five tube configuration, and so on. Furthermore, the wall thickness and/or material of each tube member may be chosen to provide substantially similar torsional wind up in each tube.

The pilot means 28 and 30, as shown in FIG. 2, maintain each of the tubes 12, 14 and 16 in substantially equal radially spaced relationship. The pilot means may comprise raised annular seats 28 and 30 which are an integrally formed portion of their respective tube members. For example, in FIG. 2, annular seat 28 is formed as a continuous portion of inner tubular member 12 and annular seat 30 is similarly formed as a portion of intermediate tubular member 14. In addition, tube members 12 and 14 may include raised annular seats 60 and 62, respectively, for attaching the tube to their respective adjacent tube members. If desired annular seats 60 and 62 may be made as separate rings and joined to both of the adjacent tubes by welding. Therefore, tube 12 includes raised annular seat 28 at one end thereof and raised annular seat 60 at the opposite end thereof. Seat 60 and seat 28 are raised at substantially equal distances radially outward beyond the outer circumferential surface 64 of tube 12. Seat 28 maintains an annular cavity 15 between outer circumferential surface 64 of tube 12 and inner circumferential surface 66 of tube 14. Seat 60 similarly maintains annular cavity 15 between tubes 12 and 14; however, seat 60 is attached to an end of tube 14 by weld 22 or the like whereas seat 28 acts as a rest or seat for maintaining tubes 12 and 14 equally radially spaced and not as a fixed connection.

Similarly, intermediate member 14 includes raised annular seat 30 at one end thereof and raised annular seat 62 at the opposite end thereof. Seat 62 and seat 30 are likewise raised at substantially equal distances radially outward beyond the outer circumferential surface 68 of tube 14. Seat 30 maintains an annular cavity 17 between outer circumferential surface 68 of tube 14 and inner circumferential surface 70 of tube 16. Seat 62 also maintains cavity 17 between tubes 14 and 16; however, seat 62 is attached to an end of tube 16 by weld 24 or the like whereas seat 30 also acts as a rest or seat for maintaining tubes 14 and 16 equally radially spaced and not as a fixed connection. Thus, pilot means 28 maintains adjacent concentric tubes 12 and 14 in radially spaced relationship and pilot means 30 maintains adjacent concentric tubes 14 and 16 in similar radially spaced relationship along the length thereof.

If desired, pilot means or seats 28 and 30 may comprise annular rings which are not made integral with their respective tubes 12 and 14 but are made as separate ring members which may be fitted and secured in position between adjacent concentric tubes such as by welding (not shown).

Vibration damping means may be provided between adjacent tube members as in FIGS. 3 and 4. The annular cavities 15 and 17 between the tubes 12, 14 and 16 may be filled or substantially filled with a torsional vibration damping medium comprising, for instance, a high viscosity silicone liquid, or a solid resilient plastic or rubber-like material such as neoprene which may or may not be bonded to adjacent tubular surfaces. If desired, the thickness of sleeves 40, as shown in FIG. 4, may be made greater than annular cavities 15 and 17. Sleeves may be placed over respective tubes and remaining tubes slid over the sleeves thereby deforming the rubber to provide precompression which enhances damping characteristics. Alternately, adjacent tube surfaces may be individually coated with a plastic or nylon-like material so that the individual coatings frictionally engage each other when adjacent tube members are concentrically arranged and have relative movement under torque loading. If preferred, only one of the two adjacent surfaces may be coated so as to frictionally engage the other surface.

FIG. 3 illustrates a high viscosity liquid 32, such as one of the silicone types, in the annular cavity 15 between tubes 12 and 14. Liquid 32 substantially fills the cavity so as to effectively contact outer surface 64 of tube 12 and inner surface 66 of tube 14. Liquid 32 is sealed in the cavity 15 by a seal 34 which may comprise a resilient annular ring bonded to surfaces 64 and 66. Of course, other suitable seals, such as piston rings in grooves, may be used, the main purpose being to effectively retain liquid 32 in cavity 15. Likewise, liquid 32 is sealed in the cavity 17 between tubes 14 and 16 in a manner similar to that described for cavity 15. The damping medium 32 is such that relative torsional movement between adjacent tube surfaces due to torsional wind up or torsional vibration tends to dissipate vibrational energy by shearing the molecules in the liquid.

FIG. 4 illustrates a sleeve of solid resilient material 40 in the cavity 15 between tubes 12 and 14. Sleeve 40 substantially fills the annular space so as to effectively contact outer surface 64 of tube 12 and inner surface 66 of tube 14. It is not necessary to seal sleeve 40 in the cavity, however, a seal may be provided if it is desired. Sleeve 40 may comprise a rubber or plastic-like material which can, if desired, be poured in a heated liquid state into the cavity which will then solidify upon cooling thus adhering to inner and outer surfaces 64 and 66 respectively. Likewise, a sleeve 40 is provided in the cavity 17 between tubes 14 and 16 in a manner similar to that described for cavity 15. Damping is accomplished mainly by hysteresis in sleeves 40.

If the adjacent tube surfaces are individually coated with a plastic or nylon-like material, damping is accomplished mainly by frictional rubbing action wherein the molecules do not shear internally in the material although surface molecules along the engaging coating surfaces do undergo a shearing effect.

Various combinations of vibration damping media may be used throughout a system of concentric tubes; that is, it may be desirable to use a solid resilient damping material between adjacent tubes 12 and 14 while a fluid type damping material is used between adjacent tubes 14 and 16.

FIG. 5 illustrates concentric members 112, 114 and 116 attached in a manner similar to that described in FIG. 1, except that intermediate member 114 is frusto-conical thereby forming annular cavities 115 and 117 which are tapered with respect to the axis of the coupling. Although the cavities are tapered, members 112, 114 and 116 along with the cavities formed thereby are concentric about the coupling axis. An advantage in having tapered cavities between the tubular members 112, 114 and 116 is that the variation in cavity thickness permits similar variation in the thickness of damping medium or sleeve 140, or the like. The result is that the varying thickness of the sleeve can be made proportional to the magnitude of torsional strain to which the sleeve is subjected. Sleeve 140 may be a solid resilient material as shown which may, if desired, be precompressed within the tapered annular cavities as previously described.

Coupling 10 may include first and second hub members 44 and 46 secured for rotation to the driving and driven members 48 and 50 respectively by conventional keys 51 as shown in FIG. 6. In the example shown, hub member 44 includes a flange 72 which is connected to shoulder 55 of flange 18 by bolts 78. Bolt holes 74 are concentrically arranged in flange 72 for alignment with threaded holes 52 in flange 18. Flanges 72 and 82 preferably include an annular shoulder 55 mating with flanges 18, 20 for centering coupling 10. Bolts 78 may be used to secure the mating flanges 72 and 18. Likewise, bolts 78 may be used to secure the mating flanges 82 and 20 shown on the right in FIG. 6. Basic coupling 10, as shown in FIG. 6, without pilot means, can accommodate limited offset and angular misalignment between the axes of drive and driven shafts 48 and 50.

Where appreciable offset, axial, or angular misalignment of shafts 48, 50 must be accommodated, coupling 10 can be combined with a gear-type or other similar coupling, as shown in FIG. 7. In this combination, flange 18 is attached to a first gear-type coupling member, generally designated 88, in a manner similar to that shown in FIG. 6. Flange 20 is attached to a second gear-type coupling member, generally designated 90 also in a manner similar to that shown in FIG. 6. Gear-type coupling members 88 and 90 are secured for rotation with driving and driven shafts 92 and 94 respectively by means of conventional keys 151. This configuration provides a combination of increased torsional flexibility and the capacity to permit considerable axial, offset and angular misalignment between the drive and driven members while torque is transmitted by the system.

The coupling 10 in FIG. 7 is shown without cavities 15 and 17 since they are not needed if the coupling is to be piloted; the continuous mating surfaces between tube members 12, 14 and 16 serve the same purpose as annular seats 28, 30 illustrated in FIG. 2 with respect to piloting. Cavities 15, 17 are used when no piloting is required and limited misalignment capability is desired, as in FIG. 1, or when piloting and vibrational damping is desired, as in FIG. 2. But, it should be understood that coupling 10, such as illustrated in FIG. 7, itself provides some damping action as a function of its torsional flexibility. Vibration damping characteristics can be enhanced by fitting the tube members 12, 14 and 16 so as to provide frictional rubbing between their contacting surfaces.

However, when piloting is desired along with appreciable misalignment capability, the coupling combination of FIG. 7 is preferred. In this construction, coupling 10 provides torsional flexibility and couplings 88, 90 provide misalignment capability; that is, they compensate for misalignment between driving and driven members 92, 94. It should be understood that coupling 10 can be combined with a single gear coupling, such as 88, connected to shaft 92 but connected directly to shaft 94 by extending flange 20 or by using a hub member similar to member 82 as shown in FIG. 6. However, it can be seen that the use of two gear couplings 88, 90 will provide twice the misalignment capability as the use of a single gear coupling.

The entire coupling of FIG. 7 is piloted; coupling 10 is piloted as previously described and the gear couplings 88, 90 are piloted as follows. Each gear coupling 88, 90 includes an inner hub member 91 secured for rotation with shafts 92, 94 respectively by means of conventional keys 151. Inner hub member 91 includes an annular ring of external spur gear teeth 93 around its outer periphery. An outer hub member 95 includes an annular ring of internal spur gear teeth 97 around its inner periphery in meshing engagement with the external gear teeth 93. Torque is transmitted through these meshing gear teeth in the customary well-known manner.

Each coupling 88, 90 also includes a seal-pilot ring member 99 secured to outer hub 95 by screws 101. Ring member 99 includes a flange 103 surrounding a mating shoulder 105 on inner hub 91. Flange 103 and shoulder 105 provide both sealing for retaining lubricant inside the coupling and piloting to maintain outer hub 95 concentric with the axis of shaft 92. Flange 103 of ring member 99 includes a rounded surface 107 to permit it and outer hub 95 to rock around shoulder 105 when shafts 92 and 94 are misaligned.

Outer hubs 95 include annular flanges 109 mating with coupling 10; screws 78 passing through flanges 109 and threaded into coupling 10 similar to that shown in FIG. 6 provide a rigid connection between outer hubs 95 and coupling 10.

Thus, the coupling, with various combinations of overlying concentric tube members transmits torque from a drive member through each succeeding tubular member of the coupling in axially alternating directions and subsequently to a driven member. Various vibration damping materials may be used between adjacent tube members. The basic coupling without pilot means can accommodate limited offset and angular misalignment between the axes of the drive and driven shafts, or, can be joined with a gear-type coupling or similar type coupling where appreciable misalignment must be accommodated.

Having thus described the invention in its best embodiment and mode of operation, that which is desired to be claimed by Letters Patent is:

1. A torsionally resilient shaft coupling for transmitting torque from a driving shaft to a driven shaft substantially coaxially aligned therewith, comprising:
   an inner tubular member adapted for connection to said driving shaft;
   an outer tubular member surrounding said inner member and defining an annular cavity therebetween, said outer member adapted for connection to said driven shaft; and
   at least one intermediate tubular member in said annular cavity,
   one end of said intermediate member connected to a corresponding end of said inner member and the opposite end connected to a corresponding end of said outer member,
   for transmitting torque from said driving shaft through said inner member, said intermediate member, and said outer member to said driven shaft.

2. The coupling of claim 1 wherein said intermediate tubular member defines a first annular clearance cavity between it and said inner tubular member and defines a second annular clearance cavity between it and said outer tubular member.

3. The coupling of claim 2 further including pilot means between said inner tubular member and said intermediate member axially opposite the connection of such members and between said outer member and said intermediate member axially opposite the connection of such members for maintaining said tubular members substantially concentric.

4. The coupling of claim 3 wherein said pilot means comprises raised annular seats formed on at least two of said tubular members in contact with an adjacent tubular member.

5. The coupling of claim 2 further including vibration damping means in said first and second annular clearance cavities between adjacent tubular members.

6. The coupling of claim 5 wherein said vibration damping means comprises a highly viscous liquid sealed between adjacent tubular members of sufficient quantity to substantially fill said annular clearance cavities.

7. The coupling of claim 5 wherein said vibration damping means comprises an annular sleeve of solid resilient material between said tubular members,
   said sleeve having a thickness sufficient for contacting each of said members.

8. The coupling of claim 7 wherein said solid resilient material is precompressed between said adjacent tubular members.

9. The coupling of claim 1 wherein said intermediate tubular member is frusto-conical for defining a first annular tapered clearance cavity between it and said inner tubular member and for defining a second annular tapered clearance cavity between it and said outer tubular member, said first cavity tapering radially outward in a first axial direction and said second cavity tapering radially inward in an opposite axial direction.

10. The coupling of claim 9 further including vibration damping means within said tapered annular cavities.

11. The coupling of claim 10 wherein said vibration damping means comprises a tapered annular sleeve of solid resilient material within each of said tapered annular cavities in contact with said adjacent tubular members.

12. The coupling of claim 11 wherein said solid resilient material is precompressed within said tapered annular cavities.

13. The coupling of claim 1 further including:
   a first hub member secured for rotation with said driving member and rigidly secured to said inner tubular member for driving said tubular member; and
   a second hub member rigidly secured to said outer tubular member and secured for rotation with said driven member for driving said driven member during rotation of said driving member.

14. The coupling of claim 13 wherein said first hub member includes:
   an inner hub member secured for rotation with said driving member, said inner hub member having an annular ring of external spur gear teeth formed thereon; and
   an outer hub member rigidly secured to said inner tubular member, said outer hub member having an annular ring of internal spur gear teeth formed thereon in meshing engagement with said external spur gear teeth for transmitting torque from said driving member to said inner tubular member.

15. The coupling of claim 14 wherein said second hub member includes:
   an inner hub member secured for rotation with said driven member, said inner hub member having an annular ring of external spur gear teeth formed thereon; and an outer hub member rigidly secured to said outer tubular member, said outer hub member having an annular ring of internal spur gear teeth formed thereon in meshing engagement with said external spur gear teeth for transmitting torque from said outer tubular member to said driven member.

16. A method of transmitting torque from a first shaft to a second shaft substantially coaxially aligned therewith comprising the steps of:

transmitting torque from said first shaft through a first connection to an outer tubular member in substantial axial alignment with said first shaft;

transmitting torque from said outer tubular member to an intermediate tubular member substantially coaxially aligned within said outer tubular member through a second connection axially spaced from said first connection toward said second shaft;

transmitting torque from said intermediate tubular member to an inner tubular member substantially coaxially aligned within said intermediate tubular member through a third connection axially spaced from said second connection toward said first shaft; and transmitting torque from said inner tubular member to said second shaft through a fourth connection axially spaced from said third connection toward said second shaft;

whereby torque is transmitted from said first shaft to said second shaft through said connections at alternate axially spaced locations.

* * * * *